June 8, 1948.　　　　E. A. BEARD　　　　2,442,992
ANIMAL POKE
Filed July 12, 1946
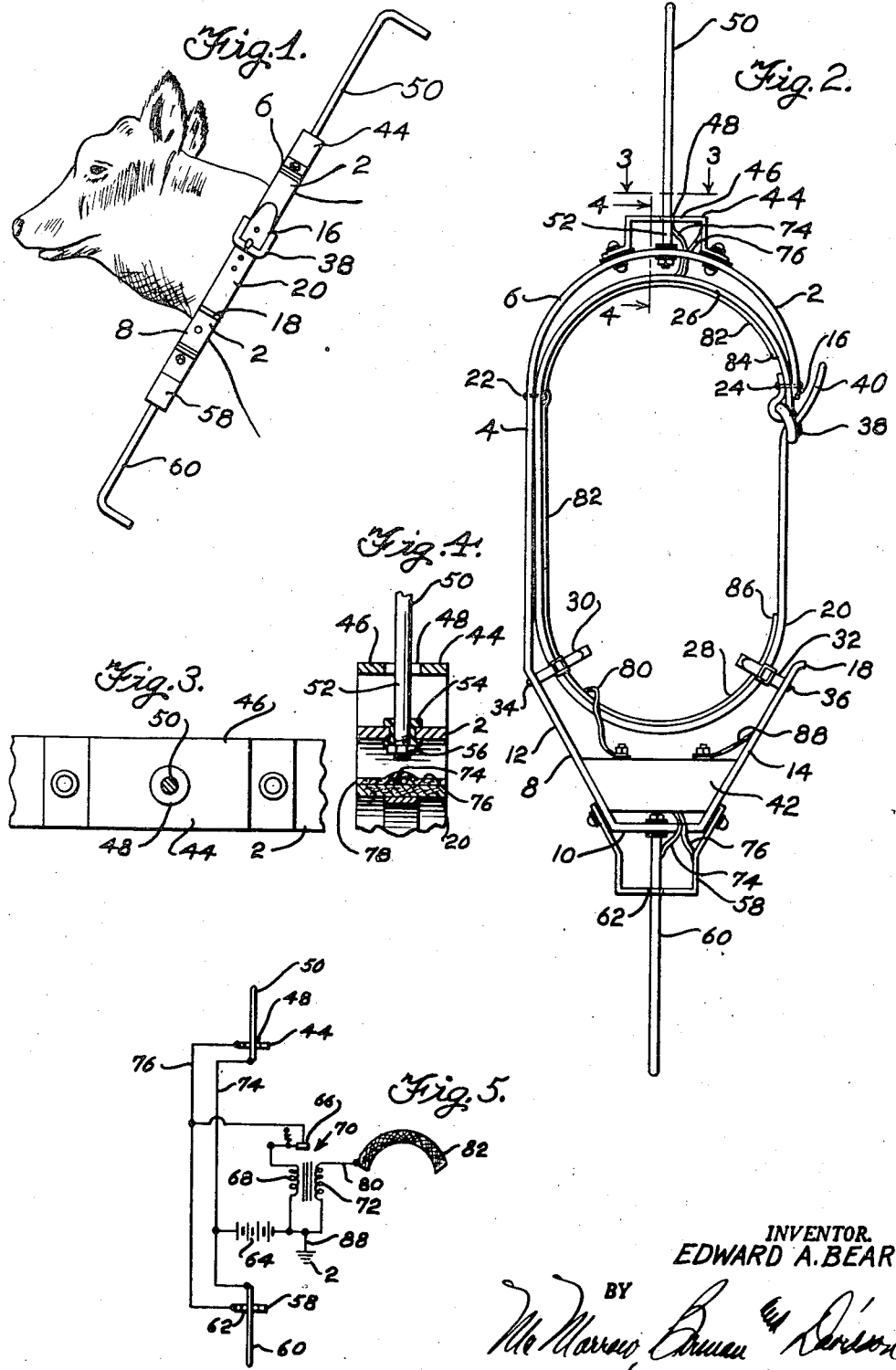
INVENTOR.
EDWARD A. BEARD
BY
ATTORNEYS Patented June 8, 1948

2,442,992

UNITED STATES PATENT OFFICE 2,442,992

ANIMAL POKE

Edward A. Beard, Marseilles, Ill.

Application July 12, 1946, Serial No. 683,209

2 Claims. (Cl. 119—136)

This invention relates to devices for restraining the movements of animals, such as for preventing cows from breaking through fences, and the like.

An object of this invention is to provide a cow poke which, when carried about the animal's neck, will prevent it from breaking through an enclosure, by giving it an electric shock.

Another object of the invention is to provide a cow poke for giving an animal an electric shock when it tries to break through a fence, and including means for fastening the device about the neck of the animal and for bringing it into operation when the animal tries to break through an enclosure.

A further object of the invention is to provide a cow poke which is not injurious to the animal, yet is simple in construction, inexpensive to manufacture, and effective in operation.

Other objects and advantages of the invention will become apparent from the following description of a preferred embodiment thereof, as illustrated in the accompanying drawings, and in which, Figure 1 is a side elevation of the device in position about the neck of a cow.

Figure 2 is a front elevation of the device shown in Figure 1.

Figure 3 is a plan view taken on line 3—3 of Figure 2.

Figure 4 is a sectional elevation taken on line 4—4 of Figure 2, and

Figure 5 is a schematic circuit diagram of the electrical connections of the device.

Reference is now had to the drawings in which like reference characters denote similar parts throughout the several views. As illustrated, there is a metal frame 2 which has a substantially straight side portion 4, with an upper end portion 6 curved as shown, and a lower end portion 8. The lower portion 8 has a substantially straight base portion 10 connected at each end to upwardly divergent side members 12 and 14. The frame 2 is conveniently formed from one piece of metal strip having a fair degree of rigidity, and as will be observed, is open at the right side between locations 16 and 18 as seen in Figure 2 to allow it to be placed around the neck of the cow.

A relatively wide strap 20, which is conveniently formed of leather or other flexible electrically insulating material, is disposed within the confines of the outer main frame 2, assuming a shape as seen in Figure 2, somewhat like an oval, the strap 20 being secured to the inside of the frame 2 by means of electrically conductive rivets 22 and 24, the upper arcuate portion 26 of the strap being spaced from the upper arcuate portion 6 of the main frame except at the location of the rivets 22 and 24.

The lower arcuate portion 28 of the strap 20 extends near the lower portion of the main frame, and is similarly spaced therefrom as illustrated in Figure 2. Smaller leather tie-straps 30 and 32 are riveted to the main frame at 34 and 36 and are buckled around the main strap 20 in a loose loop allowing plenty of play, so as to permit the cow to move its head and neck while still allowing the lower portion of the device to yield somewhat. The main strap 20 has a buckle 38 for the reception of the end 40 of the strap as illustrated.

A hollow metal box 42, shaped to fit between the inclined sides 12 and 14 of the main frame, is secured therebetween and its case is grounded to the frame. At the upper end of the device as seen in Figure 2, a substantially U-shaped bracket 44 is fastened to but insulated from the arcuate portion 6 of the main frame. The cross portion 46 has an aperture 48 formed therein which is large enough in diameter to allow a metal actuating rod 50 to extend axially therethrough while being spaced from the metal sides of the aperture 48, so as not to normally make electrical contact therewith. The upper actuating rod 50 is anchored at its lower end 52 to the arcuate portion 6 of the main frame, but is insulated therefrom. This may be done as illustrated in Figure 4, by inserting an insulating grommet 54 in an aperture formed in the main frame 2, extending the rod 50 therethrough, and securing it in place by means of a nut 56 or other fastening device thereon. The actuating rod 50 should be flexible enough that electrical contact will be made between the rod 50 and the bracket 44 when the rod 50 is bent into contact with the sides of aperture 48. Thus the combination of the rod 50 and the bracket 44 constitutes an electrical switch, which is normally open.

Another metal bracket 58 is similarly secured to but insulated from the lower portion of the main frame, and it likewise has a lower metal actuating rod 60 extending through but normally spaced from an aperture 62 formed in the bracket 58, the rod 60 being secured to and insulated from the main frame portion 10 by a construction similar to that illustrated in Figure 4 for the upper rod 50, so as to constitute a similarly normally open switch.

It is apparent that when the device is mounted on the cow's neck as illustrated in Figure 1, and the cow tries to go through a fence, contact of either of the actuating rods 60 or 50, or both, with the rails of the fence, will bend the rods against the brackets 44 or 58, thereby closing the switches formed thereby. In the construction shown, the closing of either or both of the switches as described, actuates an electrical shocking device contained inside the box 42, to give the cow a sufficiently strong, but otherwise relatively mild and harmless electrical shock which will condition it against attempting further fence breaking.

For this purpose, I have arranged several series-connected dry cell batteries 64 within the box 42 to serve as a source of power to actuate a vibrator 66 and primary coil 68 of a step-up transformer 70 whereby a relatively high voltage is induced across the secondary coil 72 of the transformer. As shown, there are two wires 74 and 76, wire 74 being connected to the rods 50 and 60 and wire 76 being connected to the brackets 44 and 58, the wires 74 and 76 also leading into the box 42 for connection to the batteries 64 and vibrator 66 as shown in Figure 5. The wires 74 and 76 may conveniently be carried in a channel formed by a thinner strap 78 carried on the back of the main belt 20.

The secondary coil 72 has one lead 80 connected to a flexible metal strip 82 carried on the inner surface of the main belt 20 and extending around from locations 84 to 86, the end 84 stopping a short distance from the metal rivet 24, and the member 82 being insulated from the other metal rivet 22. The other end of the secondary coil 72 is grounded to the main frame 2 by lead 88. It is obvious that when the cow tries to go through a fence, the rods 50 or 60 being bent against the brackets 44 or 58, close the primary circuit causing current to flow, and inducing a high voltage across the secondary, which is led to the metal strip 82 in contact with a large strip portion of the cow's neck, and to the main frame to make contact with the cow's neck through the rivets such as 24. Hence, the cow gets an electrical shock which is an efficient deterrent. When she backs away from the fence, the rods 50 and 60 resume their original position, opening the circuit, and are ready to function again when needed.

Although I have described a preferred embodiment of my invention in specific terms, it is to be understood that various changes may be made in size, shape, materials and arrangement without departing from the spirit and scope of the invention as claimed.

I claim:

1. A device for restraining unwanted movements of animals in the nature of breaking through fences and the like, comprising a main frame open at one side to allow the frame to be placed about the neck of an animal, an insulating flexible strap secured to the inside of the frame and open at one side to allow it to be buckled about the animal's neck, a container disposed on the main frame, battery operated electrical shocking means disposed therein, electrical contact members projecting outward from the main frame and insulated therefrom, bracket members carried on the main frame and insulated therefrom, said contact members and bracket members forming normally open switches adapted to be closed upon contact of said contact members with a fence or the like, said switches being connected to said shocking means, and means connected between the shocking means and the animal's body, for conducting thereto an electrical voltage induced by closing said switches, for shocking the animal.

2. A device for restraining the unwanted movements of animals in the nature of breaking through fences and the like, comprising a main frame open at one side to allow the frame to be placed about the neck of an animal, an insulating flexible strap secured to the inside of the frame and open at one side to allow it to be buckled about the animal's neck, a container disposed on the main frame, battery operated electrical shocking means including a vibrator, battery, condenser and transformer, disposed in said container for producing a high voltage, a plurality of brackets insulated from and carried on the main frame and having apertures therethrough, a plurality of projecting contact rods extending through said apertures and insulated therefrom and from the main frame, said brackets and rods constituting normally open switches which when closed by bending of said rods against said brackets, actuate said shocking means to induce said high voltage, and high voltage contact means including a flexible metal contact member carried on said strap and rivets extending through the strap, both into contact with the animal's neck, for giving it a shock upon fence breaking motion.

EDWARD A. BEARD.

REFERENCES CITED

The following references are of record in the file of this patent:

UNITED STATES PATENTS

| Number | Name | Date |
| --- | --- | --- |
| 1,751,313 | Faulhaber | Mar. 18, 1930 |
| 2,177,789 | Sacker | Oct. 31, 1939 |